United States Patent [19]
Bradley

[11] 3,828,295
[45] Aug. 6, 1974

[54] MOISTURE IMPERVIOUS IMPACT SHIELD FOR A TRANSDUCER AND METHOD OF MAKING THE SAME

[75] Inventor: Richard S. Bradley, Fairmont, Minn.

[73] Assignee: Weigh-Tronix, Incorporated, Armstrong, Iowa

[22] Filed: July 12, 1973

[21] Appl. No.: 378,709

[52] U.S. Cl. ................................. 338/6, 73/88.5 R
[51] Int. Cl. ............................................. G01b 7/16
[58] Field of Search ................................... 338/2–6; 73/88.5 R, 88.5 SD, 141 A, 141 R; 29/400, 592

[56] References Cited
UNITED STATES PATENTS
3,338,091  8/1967  Tatum............................. 73/88.5 R
3,481,189  12/1969  Brennan et al.................. 73/88.5 R Primary Examiner—C. L. Albritton
Attorney, Agent, or Firm—Williamson, Bains & Moore

[57] ABSTRACT

A moisture impervious impact shield is provided for a transducer including an elastically deformable bar having a plurality of electrical strain gauges mounted thereon for measuring the elastic deformation of the bar. The method employed in making the moisture impervious impact shield comprises forming and bonding an inner sleeve to and covering that portion of the bar to which the strain gauge is attached. This sleeve is formed of a foamed material, preferably silicone-rubber foam, which has a low bulk modulus, and therefore does not affect the transducer bar during elastic deformation thereof. An intermediate sleeve is then formed of a moisture impervious material, preferably silicone rubber and encases the inner sleeve. An outer metallic sleeve surrounds and is bonded to the intermediate sleeve and protects the electrical strain gauges against impact-type damage.

5 Claims, 4 Drawing Figures

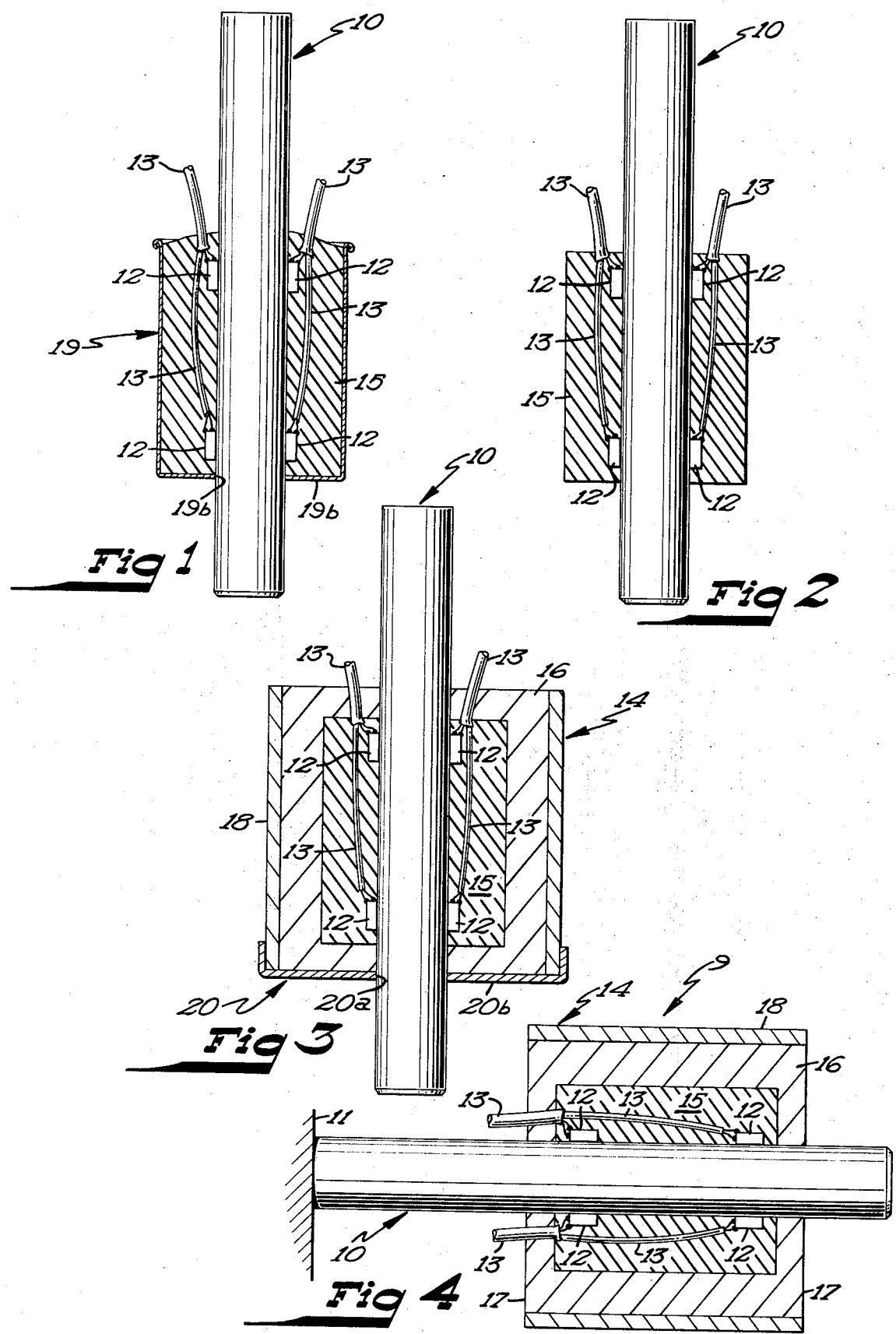

MOISTURE IMPERVIOUS IMPACT SHIELD FOR A TRANSDUCER AND METHOD OF MAKING THE SAME

SUMMARY OF THE INVENTION

This invention relates to sealing means for transducers and more specifically to a moisture impervious impact shield for elastically deformable transducers.

One of the problems experienced with the manufacture of precision transducers of the type using electrical strain gauges, is the provision of an effective moisture shield for the strain gauges while attempting to provide a highly accurate precision transducer. For example, precision transducers used as weigh bars utilize electrical strain gauges which often have a signal level in the microvolt range, and any moisture in the area of the electrical strain gauges affect the signal level by providing a shorting path from the strain gauge to the structure upon which it is mounted.

Efforts have been made to provide means for protecting the strain gauges against moisture and which does not interfere with the accuracy of the transducers. Typical of these prior art efforts is the provision of a cylindrical shield provided with one rigid end wall which is fixedly secured to the transducer and which surrounds the strain gauges. The other end of the rigid shield is closed by a diaphragm which is intended to provide a non-elastic constant and to also provide a weak link in the direction of the applied force. This type of seal while being hermetic in nature, is not only costly, but it is difficult to determine if the seal has failed unless there is some indication that the transducer is malfunctioning. In some instances, transducers will continue to function with a small amount of moisture present, thus resulting in an inaccurate reading, although the user might not recognize that the transducer is functioning inaccurately. It has also been found that these prior art sealing systems are incapable of withstanding mechanical or impact-type abuse since the diaphragm is relatively fragile and is easy to rupture.

It is also pointed out that any structure that is placed around the strain gauges also serves as a shorting path for the applied forces. In this respect, when a transducer is subjected to a load, part of the load goes through the sensing elements (strain gauges) and part of the load goes through the structure which serves as a shield for the electrical strain gauges. It has therefore been necessary to provide gain adjustment in the transducer itself in order to compensate for the effect the shield imposes upon the sensing elements. Attempts have also been made to form a moisture impervious shield or seal for the electrical strain gauges by using materials having a low bulk modulus, but such materials while not affecting the transducer, cannot withstand mechanical abuse. Thus, all of the prior art attempts to provide a precision transducer with an effective moisture and mechanical shield for the electrical strain gauges have simply not been successful.

It is therefore a general object of this invention to provide a moisture impervious impact shield for a precision transducer of the type which includes an elastically deformable bar having electrical strain gauges thereon.

It is also an object of this invention to provide a method of making a novel moisture impervious impact shield for a precision transducer.

The moisture impervious impact shield for the transducer includes an inner sleeve formed of a foamed material and bonded to the transducer bar to cover the strain gauges thereon. An intermediate sleeve of moisture impervious material encases the inner sleeve, and an outer metallic sleeve surrounds and is bonded to the intermediate moisture impervious sleeve. With this arrangement, the moisture impervious sleeve prevents the intrusion of moisture to the strain gauges and the metal sleeve shields the strain gauges against mechanical abuse. By using an inner sleeve which has a low bulk modulus, the shield does not affect the transducer even though the strain gauges are shielded against mechanical abuse and are sealed (against moisture) from the exterior.

These and other objects and advantages of this invention will more fully appear from the following description made in connection with the accompanying drawings wherein like reference characters refer to the same or similar parts throughout the several views.

FIGURES OF THE DRAWINGS

FIG. 1 is a diagrammatic sectional view of the transducer illustrating the first step in the formation of the moisture impervious, impact shield;

FIG. 2 is a diagrammatic view similar to FIG. 1, but illustrates a subsequent step in the formation of the shield;

FIG. 3 is a diagrammatic view of the transducer illustrating still another step in the formation of the shield, and FIG. 4 is a diagrammatic cross-sectional view of the completed shield.

DESCRIPTION OF THE PREFERRED EMBODIMENTS

Referring now to the drawings, and more specifically to FIG. 4, it will be seen that one embodiment of the transducer, designated generally by the reference numeral 9, is thereshown. The transducer comprises a transducer bar 10 which is formed of a suitable metallic material, preferably steel and in the embodiment shown is of elongate, straight configuration. The transducer bar 10 is illustrated supported in cantilever fashion from a support 11, but it is pointed out that the bar may be supported adjacent opposite end portions thereof if desired.

Electrical strain gauges 12 are mounted on the bar to detect elastic deformation of the bar which are produced in response to a load applied to the bar. In the embodiments shown, two pairs of such electrical strain gauges are shown, and one of these pairs of strain gauges are attached to one surface of the bar 10 and the other pair is attached to the opposed surface of the bar. It will be appreciated that these strain gauges 12 are of conventional construction, preferably, resistance wire-type, or they may be full or semi-conductor type. When the strain gauges are compressed, their electrical resistance decreases and the changes in the strain gauge resistance is caused by elastic deformation of the bar 10. Although not shown in the drawings, the strain gauges 12 will be connected to suitable electrical measuring circuitry by electrical conductors 13.

When the transducer 10 is subjected to a load, one pair of strain gauges is subjected to compression while the other pair of strain gauges are subjected to tension. Thus, one pair of strain gauges decreases its electrical resistance and the other pair increases its electrical resistance during elastic deformation of the bar. In this respect, the manner in which the transducer functions including its electrical circuitry, is disclosed in my co-pending application filed July 3, 1973, Ser. No. 373,487, entitled "Deformation Responsive Weighing Apparatus," and is incorporated by reference with respect to the instant application. It is therefore felt that further discussion of the manner of operation of the transducer 10 is unnecessary for the present application.

The strain gauges 12 must be sealed against moisture, since any moisture in the area of the strain gauge will affect the signal level by providing a shorting path from the strain gauge to the bar 10. The strain gauge signal used in a precision type transducer often has a signal level in the microvolt range, and typically, transducer manufacturers prefer to have a 5 megohm resistance between the strain gauge and the ground. It is therefore essential to seal the strain gauges against the intrusion of moisture.

Thus a moisture impervious impact shield 14 is provided and this shield serves as a moisture seal with respect to the exterior and also provides a mechanical or impact tight shield to prevent damage to the strain gauges. The moisture impervious impact shield 14 includes an inner sleeve 15 which is formed of a foamed material. In the embodiments shown, the foam material comprises silicone-rubber foam which has an extremely low bulk modulus. It will be appreciated that bulk modulus is the change in volume per unit volume when a substance is subjected to normal stresses over its entire surface area. The bulk modulus of the silicone-rubber foam inner sleeve 15 is sufficiently low so as to have substantially no effect on the transducer during elastic deformation thereof.

It is pointed out that the silicone-rubber foam maintains its characteristics over a substantially wide temperature range including those temperatures at which the transducer normally be subjected. It is also pointed out that other types of materials having a low bulk modulus may also be used particularly if the temperature range at which the transducer is to be used comprises a range narrower than the temperature range for silicone-rubber foam. In this respect, if the lowest temperature at which the transducer would be subjected is above the brittle point of the particular foamed material or potting compound, then such a foamed type potting compound could be used in lieu of the silicone-rubber foam provided that such material had a low bulk modulus.

The moisture impervious impact shield 14 also includes an intermediate moisture impervious sleeve 16 which is formed of a non-metallic material, preferably dense silicone-rubber. It will be noted that the moisture impervious sleeve 16 completely surrounds and encases the inner sleeve 15. Thus, the intermediate moisture impervious sleeve 16 includes end portions 17 that are bonded to the transducer bar 10. In this respect, it is pointed out that the portion of the bar 10 to which the inner sleeve 15 is bonded, may be first treated with a suitable primer to assure good adherence of the inner sleeve 15 thereto. Similarly, that portion of the bar 10 to which is bonded the end portions 17 of intermediate moisture impervious sleeve 16 may also be treated with a suitable primer.

The shield 14 also includes an outer cylindrical sleeve 18 formed of a suitable rigid metallic material, preferably steel, which surrounds and is bonded to the exterior surface of the intermediate sleeve 16. The shield element 18 functions as a mechanical or impact resistance shield and protects the strain gauges 12 against damage resulting from mechanical abuse. In the embodiment shown, the inner, intermediate and outer sleeves are all of cylindrical configuration and it will be noted that the axial length of the outer sleeve element 18 is substantially equal to the axial length of the intermediate moisture impervious sleeve 16. The shield 14 not only shields the strain gauges from moisture, but also protects the strain gauges from mechanical abuse.

Referring now to FIGS. 1, 2 and 3, it will be seen that the steps included in the method of making the novel shield are sequentially diagrammatically illustrated. In FIG. 1, a disposable mold member 19 is positioned around the transducer bar 10 and the mold member 19 is of generally cylindrical configuration having one end wall 19a with an opening 19b therein. The opening 19b engages the exterior surface of the bar 10 which in the embodiment shown is of cylindrical configuration, and a silicone-rubber resin and a blowing agent are introduced into the mold member. The blowing agent causes the silicone-rubber resin to foam and the foam material is allowed to cure. After the foam material has cured, the disposable mold member 19, which is preferably formed of a frangible, tearable material such as paper is torn away, and the excess foam material formed at the open end of the mold member is trimmed away, as best seen in FIG. 2.

Thereafter, a locating member 20 formed of a suitable metallic material and being of generally circular configuration is positioned upon the transducer bar 10 as best seen in FIG. 3. In this respect, the locating member 20 has a circular opening 20a centrally located therein through which the transducer bar 10 projects. The locating member 20 also has an annular flange 20b integral therewith and projecting axially therefrom. The locating member 20 is spaced axially from one end of the inner sleeve 15 and serves to locate and support the outer sleeve 18 in proper predetermined spaced relation with respect to the inner sleeve 15 during formation of the intermediate sleeve 16. It will also be noted that the outer sleeve 18 when so located, projects axially from opposite ends of the sleeve 15. After the locating member 20 and outer sleeve 18 have been properly located on the transducer bar, the locating member 20 and the outer sleeve 18 are then oriented in an upright manner to define a receptacle in which is introduced a silicone-rubber resin. It will be noted that the resin will flow around opposite ends of the inner sleeve 15 to completely encase the inner sleeve and the resin is then allowed to cure.

After the resin which forms the intermediate sleeve 16 is cured, the locating member 20 is removed from the transducer bar and the shield 14 will then be completed. It is pointed out that the inner surface of the sleeve 18 may be treated with a suitable primer to assure good bonding or adherence of the silicone-rubber to the sleeve 18. The intermediate sleeve 16 is much denser than the inner sleeve 15 and therefore serves as an extremely effective moisture barrier. It is pointed out that transducers of the type described are especially adaptable for use as weigh bars in precision scales, although such transducers also may have other functions.

It will therefore be seen from the foregoing description that I have provided a highly effective moisture impervious impact resistant shield for a transducer, which because of its unique construction, does not affect the gain of the transducer.

Thus, it will be seen that I have provided a moisture impervious impact resistance shield for a transducer which is not only of simple and inexpensive construction, but one which functions in a more efficient manner than any heretofore known comparable arrangement.

What is claimed is:

1. A transducer device comprising:
   an elongate elastically deformable bar being elastically deformable in response to a load applied thereto,
   a plurality of pairs of electrical strain gauges mounted on said bar for detecting changes in the electrical properties of the strain gauges produced in response to elastic deformation of the bar, said strain gauges being adapted to be connected to electrical measuring circuitry for measuring the changes in electrical properties in strain gauges and producing an output representative of the magnitude of the load,
   an inner sleeve formed of a low bulk modulus foamed material adhering to said bar and covering said strain gauges, the bulk modulus of said inner sleeve being sufficiently low so as not to affect the bar during elastic deformation thereof,
   an intermediate sleeve formed of moisture impervious non-metallic material completely covering and adhering to said first sleeve and adhering to said bar,
   and an outer sleeve formed of a rigid material and covering and bonded to said intermediate sleeve.

2. The transducer device as defined in claim 1 wherein said inner sleeve is formed of a silicone-rubber foam.

3. The transducer device as defined in claim 1 wherein said outer sleeve is formed of a metallic material.

4. The transducer device as defined in claim 1 wherein said inner sleeve is formed of silicone-rubber foam, said intermediate sleeve being formed of silicone-rubber, and said outer sleeve being formed of metal.

5. A transducer device comprising:
   an elongate elastically deformable bar being elastically deformable in response to a load applied thereto,
   a plurality of pairs of electrical strain gauges mounted on said bar for detecting changes in the electrical properties of the strain gauges produced in response to elastic deformation of the bar, said strain gauges being adapted to be connected to electrical measuring circuitry for measuring the changes in electrical properties in strain gauges and producing an output representative of the magnitude of the load,
   an inner sleeve formed of a low bulk modulus material adhering to said bar and covering said strain gauges, the bulk modulus of said inner sleeve being sufficiently low so as not to affect the bar during elastic deformation thereof,
   an intermediate moisture impervious sleeve formed of silicone rubber completely covering and adhering to said first sleeve and adhering to said bar,
   and an outer sleeve formed of a rigid material and covering and bonded to said intermediate sleeve.

* * * * *